(12) United States Patent
Cahoon et al.

(10) Patent No.: US 11,880,746 B1
(45) Date of Patent: Jan. 23, 2024

(54) INTERFACE FOR ARTIFICIAL INTELLIGENCE TRAINING

(71) Applicant: HRB Innovations, Inc., Las Vegas, NV (US)

(72) Inventors: Daniel Cahoon, Leawood, KS (US); Mansoor Syed, Kansas City, MO (US); Robert T. Wescott, Trimble, MO (US)

(73) Assignee: HRB Innovations, Inc., Wilmington, DE (US)

( * ) Notice: Subject to any disclaimer, the term of this patent is extended or adjusted under 35 U.S.C. 154(b) by 879 days.

(21) Appl. No.: 15/497,690

(22) Filed: Apr. 26, 2017

(51) Int. Cl.
  *G06N 20/00* (2019.01)
  *G06F 3/0482* (2013.01)
  *G06F 3/04817* (2022.01)

(52) U.S. Cl.
  CPC .......... G06N 20/00 (2019.01); G06F 3/0482 (2013.01); *G06F 3/04817* (2013.01); *G06F 2203/04803* (2013.01)

(58) Field of Classification Search
  CPC ... G06N 20/00; G06F 3/0482; G06F 3/04817; G06F 2203/04803
  See application file for complete search history.

(56) References Cited

U.S. PATENT DOCUMENTS

| | | | | |
|---|---|---|---|---|
| 7,640,305 B1* | 12/2009 | Arthur | ................... | H04L 51/212 709/204 |
| 10,783,167 B1* | 9/2020 | Dutta | ................ | G06F 16/24578 |
| 2008/0103996 A1* | 5/2008 | Forman | ................... | G06N 20/00 706/12 |
| 2008/0162310 A1* | 7/2008 | Quinn | .................... | G06Q 10/10 705/31 |
| 2011/0202555 A1* | 8/2011 | Cordover | ............. | G06Q 10/107 707/769 |
| 2013/0129231 A1* | 5/2013 | Dale | .................... | G06K 9/6254 382/224 |
| 2015/0019460 A1* | 1/2015 | Simard | ................. | G06F 40/242 706/11 |
| 2016/0162456 A1* | 6/2016 | Munro | .................. | G06F 3/0482 704/9 |
| 2016/0162458 A1* | 6/2016 | Munro | ................ | G06F 17/2241 715/230 |
| 2016/0328466 A1* | 11/2016 | Niculescu-Mizil | ... | G06F 16/285 |
| 2018/0005191 A1* | 1/2018 | Metrewar | ......... | G06F 16/24578 |
| 2018/0018741 A1* | 1/2018 | Mukherjee | ............ | G06N 20/00 |
| 2018/0121825 A1* | 5/2018 | Kumar | ................ | G06F 17/2881 |
| 2018/0189170 A1* | 7/2018 | Dwarakanath | ...... | G06F 11/3664 |

\* cited by examiner

*Primary Examiner* — Li B. Zhen
*Assistant Examiner* — Henry Nguyen
(74) *Attorney, Agent, or Firm* — Erise IP, P.A.

(57) ABSTRACT

Media and method for a user interface for training an artificial intelligence system. Many artificial intelligence systems require large volumes of labeled training data before they can accurately classify previously unseen data items. However, for some problem domains, no pre-labeled training data set may be available. Manually labeling training data sets by a subject-matter expert is a laborious process. An interface to enable such a subject-matter expert to accurately, consistently, and quickly label training data sets is disclosed herein. By allowing the subject-matter expert to easily navigate between training data items and select the applicable labels, operation of the computer is improved.

20 Claims, 4 Drawing Sheets

INTERFACE FOR ARTIFICIAL INTELLIGENCE TRAINING

BACKGROUND

1. Field

Embodiments of the invention generally relate to artificial intelligence systems and, more particularly, to a user interface whereby a subject-matter expert can quickly and consistently label a set of training data for use in training an artificial intelligence system.

2. Related Art

Traditionally, artificial intelligence systems have been broadly used in classification tasks. For example, an artificial intelligence system might be used to identify faces in a photograph, perform speech-to-text translation, or to identify which topics are relevant to a free-text user query. Some types of artificial intelligence system, such as neural networks, have the drawback of requiring large volumes of labeled training data to illustrate what a face in a photograph looks like, what the appropriate text for a given spoken word or phrase is, or what keywords or phases in a particular query are relevant to a given help topic.

For some problem domains, standard pre-labeled data sets are available. For example, data sets of images labeled with their contents (street sign, dog, car, etc.) are available. However, training all classifiers on a single data set may introduce classification bias. Furthermore, for some problem domains, no pre-labeled training data set may be available. However, existing techniques for allowing a subject-matter expert to view each item in a new training data set and manually label it with the appropriate label suffer from being slow, error-prone and inconsistent. As such, a user interface is needed to allow a subject-matter expert to quickly, accurately, and consistently label a set of training data.

SUMMARY

Embodiments of the invention address the above-described need by providing for a user interface for artificial intelligence training. In particular, in a first embodiment, the invention includes one or more non-transitory computer storage media storing computer-executable instructions that, when executed, display a user interface for use in training an artificial intelligence system and operable by a subject-matter expert comprising a first pane displaying at least a subset of a plurality of training data items and an indication of a current training data item of the plurality of training data items a second pane displaying a plurality of indicia of labels, wherein each label is applicable to one or more items of the plurality of training data items wherein the interface if configured such that the subject-matter expert can select one or more labels of the plurality of labels, wherein, by selecting the one or more labels of the plurality of labels, the subject matter indicates that the artificial intelligence system should apply the one or more labels when classifying the training data item.

In a second embodiment, the invention includes a method of labeling a training data set for an artificial intelligence system comprising the steps of ingesting a set of training data comprising a plurality of training data items, determining a set of labels relevant to the set of training data, and for each training data item of the plurality of training data items presenting the training data item to a subject-matter expert, presenting indicia of at least a portion of the set of labels to the subject-matter expert, receiving, form the subject-matter expert, a selection of one or more labels of the presented labels, and storing an indication of the data item together with an indication of the selection of the one or more labels for use in training the artificial intelligence system.

In a third embodiment, the invention includes one or more non-transitory computer-storage media storing computer executable instructions that, when executed by a processor present an artificial intelligence system training user interface comprising a first pane displaying a training data item of a set of training data for an artificial intelligence system, and a second pane displaying indicia of a plurality of labels relevant to the set of training data, receive, from a subject-matter expert, a selection of on or more labels of the plurality of labels that the artificial intelligence system should apply to the training data item; and store the training data item together with the selection of one or more labels in a training data store.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
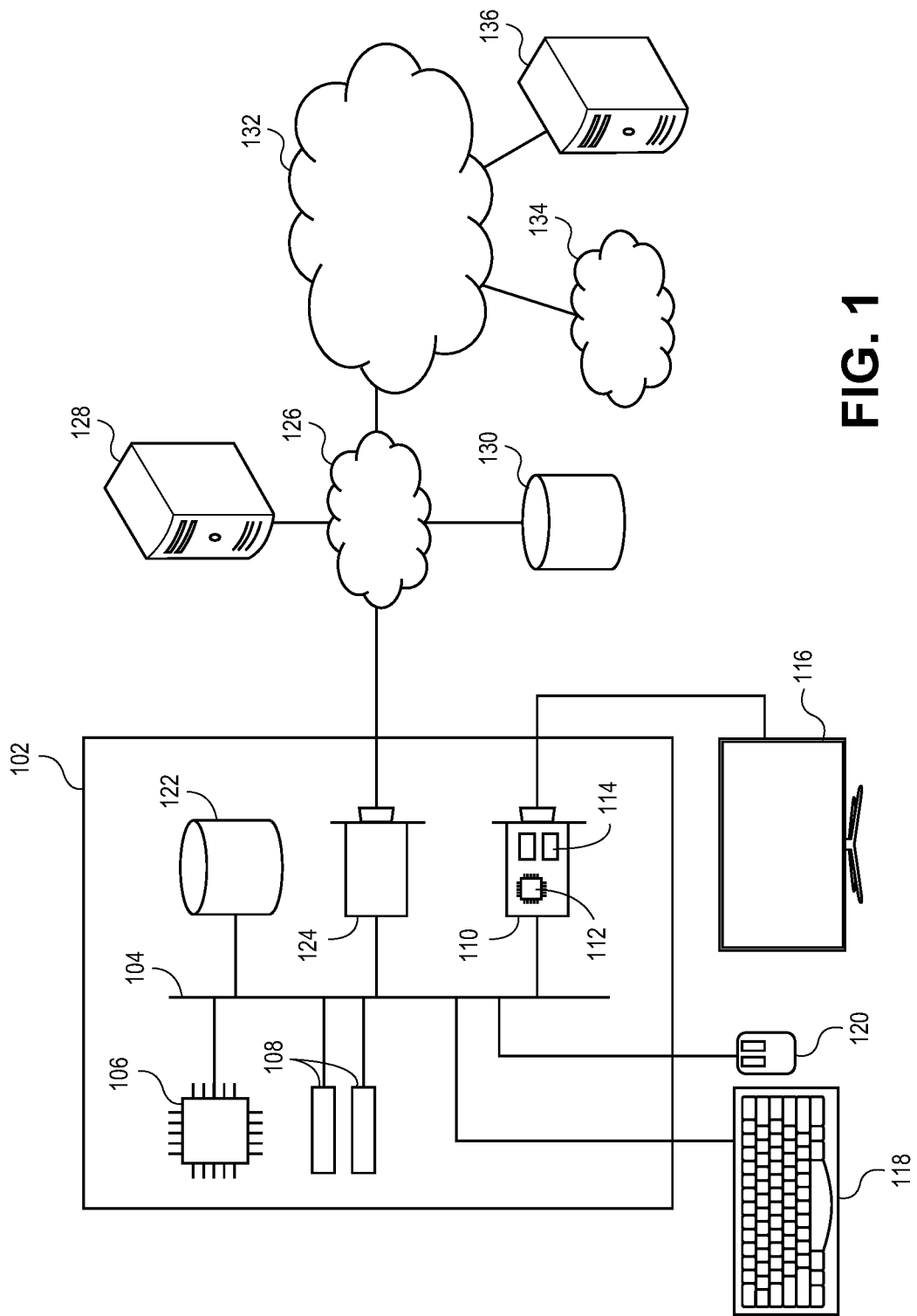
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
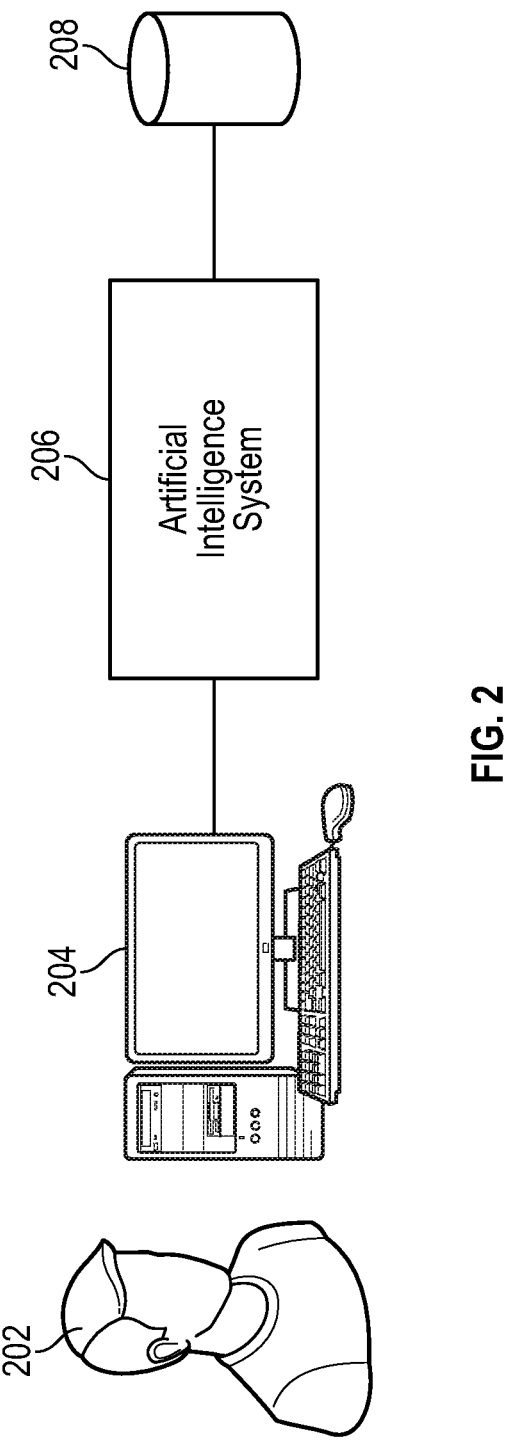
FIG. 2 depicts a block diagram illustrating several components of a system embodying the invention.

Turning now to FIG. 2, a block diagram illustrating several components of a system embodying the invention is depicted and referred to generally by reference numeral 200. As depicted, subject-matter expert 202 uses training interface 204 to train artificial intelligence system 206 based on training data store 208. Broadly speaking, artificial intelligence systems such as artificial intelligence system 206 can be applied in a wide variety of contexts. For example, an artificial intelligence system can be trained to recognize imagery and classify it into categories (street sign, person, vehicle, and so forth). As another example, artificial intelligence systems can be trained to recognize a user's speech and convert it to text. As a third example, an artificial intelligence system can be trained to respond to a user's inquiry with relevant information on a variety of topics. For the sake of brevity, the result derived by an artificial intelligence system for a particular item of data will be referred to as the "classification" of that data item, whether it is the contents of an image, the text corresponding to a speech clip, relevant topics for a user's query, or any other output of the artificial intelligence system.

A common need of such systems, however, is a set of "ground truth" data. For example, in order to classify an image as a street sign, the system must be provided with a large number of images of street signs from which to derive the essential features for recognizing other street signs in the future. Commonly, a large set of sample data (for example, images) is provided together with the actual contents of the data (for example, whether each image is a person, a street sign, etc.). These actual contents of each data item are typically determined by a subject-matter expert who can view the data and determine what the correct classification should be for that data item. This ground truth for the image (also called a "label" for the data) can then be provided, together with the data itself, as training data for the artificial intelligence system.

Similarly, when evaluating the performance of an artificial intelligence system, the subject-matter expert can be presented with the data item and the classification of the data item generated by the artificial intelligence system and determine whether the generated classification is correct. Misclassified data items can be manually relabeled and used as further training data for the artificial intelligence system. Accordingly, during the initial process of labeling training data and during any subsequent process of performance evaluation and manually relabeling misclassified images, subject-matter expert 202 interacts with artificial intelligence system 206 via interface 204. The data, together with the appropriate labels (and, when classified by artificial intelligence system 206, their classifications) are stored in training data store 208.

To achieve accurate classifications, artificial intelligence systems require large training sets (i.e., labeled examples of data of the type they are to classify). This means that subject-matter experts such as subject matter expert 202 must manually label large numbers of training data items. Furthermore, these training sets must be accurately and consistently labeled. Thus, for example, if the training data has some street signs labeled as "traffic sign," some as "street sign" and some as "sign," this lack of consistency can both reduce the effective size of the training data set and reduce classification accuracy via the artificially introduced distinction between these labels. As such, it is important that interface 204 allow for the rapid, accurate, and consistent labeling of training data. Such an interface is described below.

Figure 3:
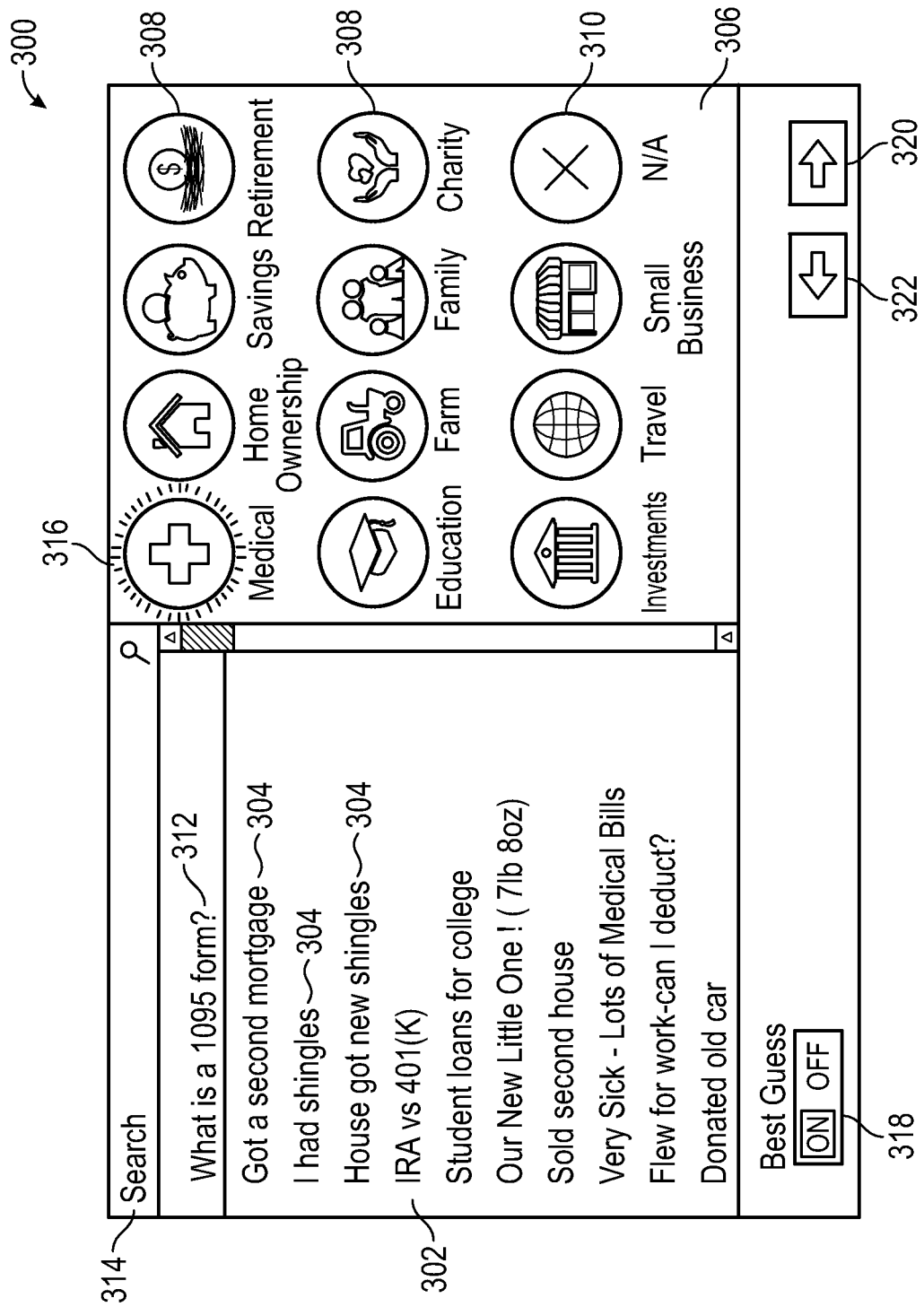
FIG. 3 depicts an interface for artificial intelligence training in accordance with embodiments of the invention.

Turning now to FIG. 3, an interface for artificial intelligence training is depicted and referred to generally by reference numeral 300. Interface 300, corresponding to interface 204 in FIG. 2, includes a variety of features to let a subject-matter expert such as subject-matter expert 202 to quickly and consistently classify data items. As such, pane 302 includes a series of data items 304 to be labeled and pane 306 includes a variety of anchors (such as labels) that can be associated with each data item. For example, as depicted, interface 300 is being used to label statements about a taxpayer's financial situation as being related to various tax topics.

Thus, in FIG. 3, the data items 304 correspond to statements a user might make or has made about their tax situation. In some embodiments, these statements might be made during a tax interview and transcribed by a tax professional. In other embodiments, these statements might be the product of voice recognition performed when a user calls a telephonic or Internet help line. In still other embodiments, these statements may be taken from a non-tax-related context. For example, the user may have posted a picture with the caption "Our new little one! (7 lb 8 oz)" to social media. A human tax professional, upon seeing this statement, would know that this statement indicates that the taxpayer likely had a new baby, and would ask questions about dependents and childbirth medical expenses. Similarly, an artificial intelligence for conducting a tax interview could, if suitably trained, ingest the taxpayer's social media feed, make the same inferences, and automatically present the relevant interview questions.

In other embodiments, pane 302 can contain other types of data. For example, in the image-recognition example described above, pane 302 could contain sample images containing images similar to those to be classified. Alternatively, pane 302 could contain icons representing speech samples. When the subject-matter expert selects a speech sample icon, the corresponding speech is played for the user. Broadly speaking, pane 302 can contain (representatives of) any type of training data for a subject-matter expert to label appropriately.

Similarly, pane 306 contains one or more indicia of labels 308 which can be applied to each data item. In some embodiments, these labels are depicted as icons for quick recognition by the subject matter expert. In other embodiments, the labels are depicted in text form. In still other embodiments, both icons and text are used to represent the labels. Broadly speaking, any number of labels can be applied to a particular data item. For example, in the "new baby" example above, a subject-matter expert might apply both the "dependents" label and the "medical" label. Similarly, an image depicting a dog standing in front of a stop sign might have both the "pet" and "street sign" labels applied to it. In other embodiments, interface 300 can restrict the applied labels 308 such that only a single label can be applied to a particular data item. In some embodiments, a special "not applicable" label 310 can be selected by the subject-matter expert to indicate that the data item is not relevant to any of the supplied labels.

In some embodiments, a hierarchy of labels may be used instead, such that selecting a label 308 causes pane 306 to display an additional set of sublabels corresponding to the selected label. For example, in the image-recognition example described above, the top-level labels might correspond to "person," "animal," "plant," "man-made object" and so forth. When the subject-matter expert selects "animal," a new set of sublabels including "cat" "dog," "horse," and so on might be displayed. In this way, a larger set of labels can be employed than would be practical without a label hierarchy.

In some embodiments, all available labels (or all labels at a given level of the label hierarchy) are presented in pane 306. In other embodiments, labels can be filtered based on a preliminary classification. For example, a partially trained artificial intelligence system might be accurate enough to narrow down a set of labels but not to make a final classification. In such a case, the set of labels presented to the subject-matter expert can be reduced to those labels that have not been eliminated. In other embodiments, labels can be sorted based on an estimated likelihood of being the applicable label, such that the most likely labels are presented first.

In operation, a particular data item 312 is selected for labeling. In some embodiments, interface 300 may automatically iterate through each data item to be classified in turn. In other embodiments, the subject matter expert can manually select a data item 304 to label. For example, the subject matter expert may label all related data items and then move on to the next set of related items. Alternatively, a subject-matter expert may skip a particularly difficult-to-label data item and come back to it later. In some embodiments, a search box 314 may be present to locate a particular data item or filter the training data set to data items matching a particular search query.

With particular data item 312 selected, the subject-matter expert can select one or more labels such as applicable label 316 using, for example, a mouse. Selected labels may be haloed, colored, or otherwise highlighted to indicated that is has been selected. As described above, some embodiments may allow multiple labels to be selected for each data item and other embodiments may limit each data item to one (or another fixed number) of labels. If a user unintentionally selects a label, selecting it a second time may unselect it. In some embodiments, a "Best Guess" toggle 318 may be present. When the Best Guess toggle is active, the artificial intelligence system may attempt to pre-select the appropriate labels for each data item. In such an embodiment, the user can then either indicate that the system's classifications are correct or relabel the data item to refine the classifier.

Once the subject-matter expert is satisfied that the set of selected labels is correct for the particular data item being classified, they can move on to the next data item using "forward" button 320. If the user wishes to revisit a previously labeled data item, they can go back using "back" button 322. In some embodiments, the set of labels selected for each data item is saved in data store 208 and restored to interface 300 whenever the subject-matter expert navigates back to a previously classified data item, whether by using forward button 320, back button 322, data item pane 302, or search bar 314.

Figure 4:
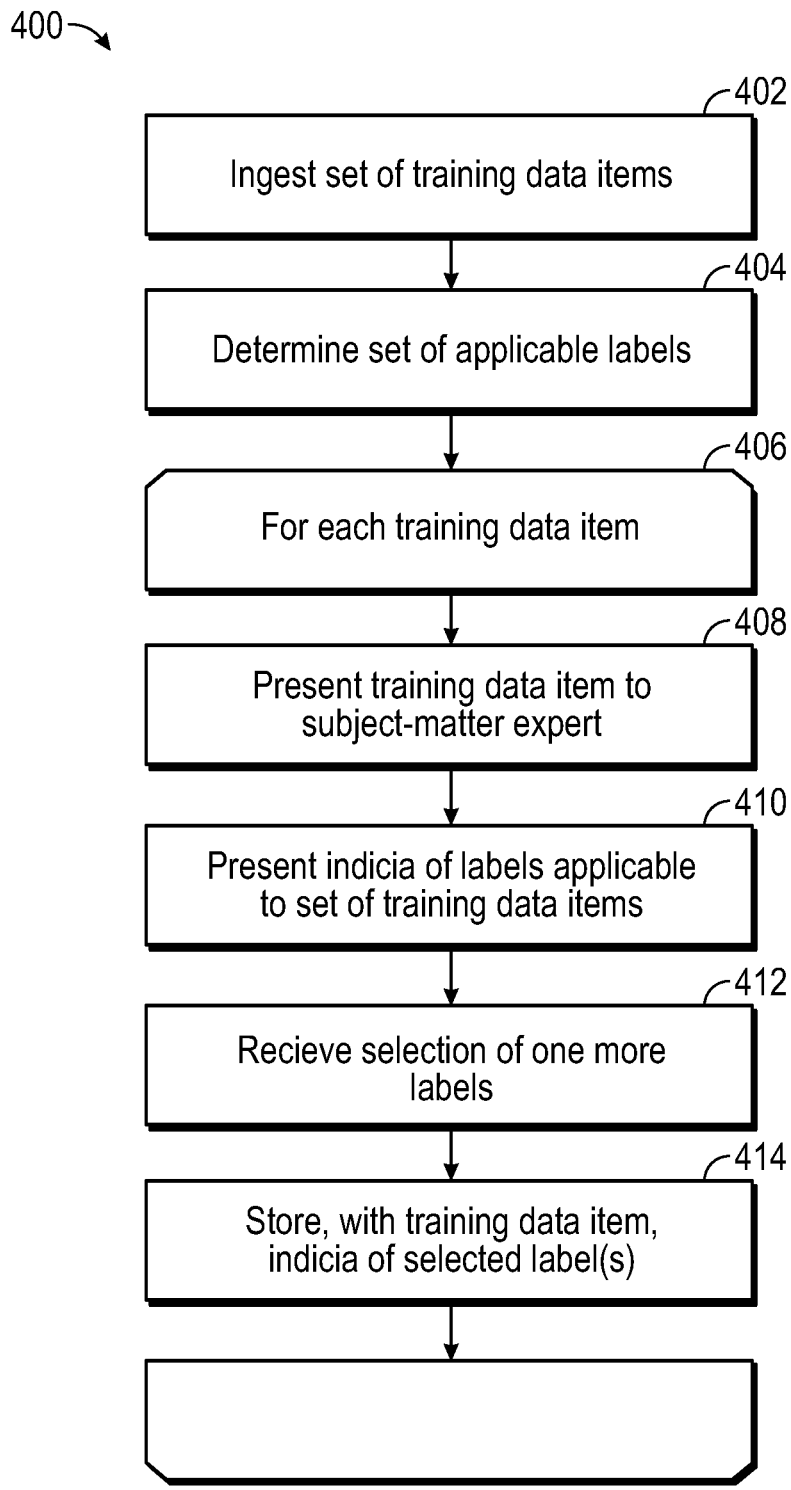
FIG. 4 depicts a flowchart depicting a method in accordance with embodiments of the invention.

Turning now to FIG. 4, a flowchart depicting a method in accordance with embodiments of the invention is depicted and referred to generally by reference numeral 400. Initially, at a step 402, when the system ingests the set of training data items. As described above, the training data can be any set of data items similar to those being classified by the system. For example, if the artificial intelligence system will be classifying images, than the training data set might be a library of images. For some fields, a standard set of training data might be available. For other embodiments, a portion of the data to be classified can be apportioned as training data. In still other embodiments, data previously classified by other means can be used as the training data set. As a part of the process on ingestion, the set of training data may be standardized. For example, images may be resized, large textual bodies may be broken down into sentences, or long sound clips may be broken down into shorter fragments.

Processing can then proceed to a step 404, where the set of labels applicable to the data set is determined. In some embodiments, the labels will be determined by the nature of the classification problem. For example, in the context of facial recognition, then the set of people being recognized will be the set of labels. In other embodiments, labels can be selected from a larger set of potential labels. For example, when recognizing spoken text, the vocabulary to be recognized can be selected as the most common spoken words out of the entire dictionary of possible words. In still other embodiments, the set of labels is selected so as to partition a conceptual space. For example, when classifying the contents of an image a set of common objects must be selected in order to have broad coverage; however, it is infeasible to enumerate all possible objects and then choose a subset. Rather, broad categories can be selected to have a good coverage of the potential subject space. In yet other embodiments, such as determining relevant help topics from free-form user queries, the set of labels may be predetermined based on the available help topics or categories of help topics.

Processing can then proceed to loop 406, which is processed once for each item of training data in the training data set. In some embodiments, each item of training data is processed more than once and in other embodiments, only a subset of the training data is processed. For example, the training data may be divided into thirds and three subject-matter experts each assigned to label two-thirds of the data. In that way, each data item is labeled independently twice and data items with different labels can be reconciled by the third subject-matter expert. One of skill in the art will appreciate that there are many possible divisions of the set of training data among various numbers of subject-matter experts with varying amounts of cross-checking available. Of course, in some embodiments, a single subject-matter expert can label all of the data unaided.

For each training data item, that data item is presented to the subject matter expert. The form of presentation will depend on the type of data item being classified. For example, text or images may be displayed on a screen and speech clips could be played on headphones or speakers. Other types of data items may be presented differently. For example, if the artificial intelligence system is to be used for generating descriptions of wines based on their spectroscopic data, then the data that will be used by the system (the spectroscopic data) may never be presented to the subject-matter expert. Rather, a sample of the wine can be dispensed or an indication of one of a set of pre-dispensed samples displayed.

Processing can then proceed to step 410, where indicia of the previously determined labels are displayed on the interface for artificial training to the subject-matter expert. As described above, the indicia can take the form of icons, icons with accompanying text, or any other way of conveying the label concisely to the subject-matter expert. Thus, for example, as depicted in FIG. 3, round emblems containing an icon and a textual shorthand for the label can be used to quickly allow the subject-matter expert to identify the relevant label or labels.

As described above, in some embodiments, all labels are presented to the user with a default, unselected state. In some embodiments, such as where prior classification data is available, labels may be filtered or sorted based on the prior classification. In some such embodiments, a function may be available to show all available labels in the event that the most appropriate label has been incorrectly filtered out. In some embodiments, a "best guess" function is available to preselect the label or labels most likely to be correct based on the current state of training of the classifier or based on prior classification data.

Next, at step 412, the system receives, from the subject-matter expert, a selection of one or more labels. For example, the subject-matter expert may select the single label that best applies to the data item being classified. Alternatively, the subject-matter expert may select all labels that apply to the data point being classified. In some embodiments the interface may enforce certain constraints on the set of labels selected. For example, if a first label is currently selected, the system is configured to allow only a single label to be chosen for each data item, and the subject-matter expert selects a different label, the first label may be automatically deselected. Similarly, if the system is configured such that two particular labels are mutually exclusive, selecting one may cause the other to become deselected if it was previously selected.

In embodiments where a hierarchy of labels is provided for, selecting a label may cause all sublabels of that label to be displayed, and so on until the subject-matter expert selects no more sublabels or until the selected label has no more sublabels. Alternatively, the subject-matter expert can select an ordered set of labels. For example, if the artificial intelligence system is recognizing speech, then the system can present a set of labels representing candidate words in the speech sample, and the subject-matter expert can select, in order, the correct candidate for each word.

Finally, at step 414, the system stores indicia of the data item and the selected label or labels in the training data store. In some embodiments, the training data item itself may be stored. In other embodiments, information derived from the the training data item is stored instead. In yet other embodiments, an identifier, reference, or database key for the training data item is stored with the labels or indicia of the labels. This information can be used to train the artificial intelligence system to classify similar data items. In some embodiments, this classification occurs in real time, such that the "best guess" selections, label filtering and/or sorting for subsequent data items are updated based on the labeling of the current data item. In this way, the processing of labeling the training data set can be accelerated still further.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-storage media storing computer-executable instructions that, when executed, display a user interface for use in training an artificial intelligence system and operable by a subject-matter expert comprising:
    a first pane displaying:
        at least a subset of a plurality of training data items;
        an indication of a current training data item of the plurality of training data items;
    a second pane displaying:
        a plurality of indicia corresponding to a plurality of labels, wherein each label of the plurality of labels is applicable to one or more items of the plurality of training data items;
    wherein the user interface is configured such that the subject-matter expert can select and unselect one or more labels of the plurality of labels,
    wherein, by selecting the one or more labels of the plurality of labels, the subject-matter expert indicates that the artificial intelligence system should apply the one or more labels when classifying the current training data item,
    wherein automatic preliminary classification of the plurality of training data items occurs in real time based on a current state of training of the artificial intelligence system, and
    wherein the artificial intelligence system filters out one or more filtered labels of the plurality of labels that are not applicable to the current training data item based on the automatic preliminary classification;
    a toggle,
    wherein the artificial intelligence system sorts the one or more labels based on an estimated likelihood of the one or more labels being applicable to the current training data item and preselects one or more preselected labels of the plurality of labels as applicable to the current training data item based on the automatic preliminary classification, and
    wherein the automatic preliminary classification of subsequent data items is updated based on the subject-matter expert selecting labels and unselecting preselected labels corresponding to the current training data item;
    a not-applicable indicium to indicate that at least one of the plurality of training data items is not relevant to any of the one or more labels;
    a function for displaying indicia corresponding to all available labels, when the subject-matter expert determines an applicable label has been incorrectly filtered out based on the automatic preliminary classification;
    a forward button to allow the subject-matter expert to move from the current training data item to a next one of the plurality of training data items; and
    a back button to allow the subject-matter expert to move from the current training data item to a previous one of the plurality of training data items.

2. The one or more non-transitory computer-storage media of claim 1, wherein each training data item of the plurality of training data items is a text data item.

3. The one or more non-transitory computer-storage media of claim 1, wherein each indicium of a label of the plurality of indicia of the labels comprises an icon.

4. The one or more non-transitory computer-storage media of claim 3, wherein each indicium of the label of the plurality of indicia of the labels further comprises text.

5. The one or more non-transitory computer-storage media of claim 1, wherein preselecting of the one or more preselected labels as applicable to the current training data item based on the automatic preliminary classification occurs in real time based on the current state of the training of the artificial intelligence system.

6. The one or more non-transitory computer-storage media of claim 1, wherein the user interface is configured to allow the subject-matter expert to navigate between training data items.

7. The one or more non-transitory computer-storage media of claim 1, wherein the one or more labels selected by the subject-matter expert are highlighted in the second pane.

8. The one or more non-transitory computer-storage media of claim 1, wherein each training data item of the subset of the plurality of training data items is a statement about a taxpayer's financial situation.

9. The one or more non-transitory computer-storage media of claim 1, wherein each label of the plurality of labels corresponds to a tax topic.

10. The one or more non-transitory computer-storage media of claim 1, wherein receiving, from the subject-matter expert, a selection of a label of the plurality of labels causes a preselected label of the plurality of labels to become automatically unselected.

11. One or more non-transitory computer-storage media storing computer executable instructions that, when executed by a processor:
    present an artificial intelligence system training user interface comprising:
        a first pane displaying a current training data item of a set of training data items for an artificial intelligence system;
        a second pane displaying a first set of indicia corresponding to a plurality of labels relevant to the set of training data items, wherein automatic preliminary classification of the set of training data items occurs in real time based on a current state of training of the artificial intelligence system, wherein the artificial intelligence system filters out one or more labels of the plurality of labels that are not applicable to the current training data item based on the automatic preliminary classification and prior classification data, and wherein the second pane further displays a not-applicable indicium to indicate that at least one of the set of training data items is not relevant to any of the one or more labels, and wherein the second pane further displays a function for showing a second set of indicia corresponding to all available labels, when a subject-matter expert determines an applicable label has been incorrectly filtered out based on the automatic preliminary classification;

wherein the second pane further displays the not-applicable indicium corresponding to the function for showing the second set of indicia, when an appropriate label has been incorrectly filtered out based on the automatic preliminary classification; and a toggle, wherein the artificial intelligence system sorts the one or more labels based on an estimated likelihood of the one or more labels being applicable to the current training data item and preselects one or more preselected labels as applicable to the current training data item based on the automatic preliminary classification;

receive, from the subject-matter expert, a selection or unselection of one or more received labels of the plurality of labels that the artificial intelligence system should apply to the current training data item, wherein automatic preliminary classifications of subsequent data items is updated based on the subject-matter expert selecting labels and unselecting preselected labels corresponding to the current training data item;

store the current training data item together with the selection of the one or more received labels in a training data store;

a forward button to allow the subject-matter expert to move from the current training data item to a next one of the set of training data items; and a back button to allow the subject-matter expert to move from the current training data item to a previous one of the set of training data items.

12. The one or more non-transitory computer-storage media of claim 11, wherein the first pane displays a plurality of training data items of the set of training data items.

13. The one or more non-transitory computer-storage media of claim 11, wherein the first set of indicia of the plurality of labels comprise a plurality of icons corresponding to the plurality of labels.

14. The one or more non-transitory computer-storage media of claim 11, further storing instructions to:
    ingest the set of training data items; and
    determine the plurality of labels, wherein each label of the plurality of labels is relevant to at least one training data item in the set of training data items.

15. The one or more non-transitory computer-storage media of claim 11, wherein the second pane indicates the selection of the one or more received labels by highlighting one or more corresponding indicia of the one or more received labels.

16. The one or more non-transitory computer-storage media of claim 11, wherein preselecting of the one or more preselected labels as applicable to the current training data item based on the automatic preliminary classification occurs in real time based on the current state of the training of the artificial intelligence system.

17. The one or more non-transitory computer-storage media of claim 11, wherein:
    the first pane displays a plurality of training data items of the set of training data items for the artificial intelligence system; and
    the artificial intelligence system training user interface is configured to allow the subject-matter expert to navigate to a particular training data item of the plurality of training data items.

18. The one or more non-transitory computer-storage media of claim 11, wherein each training data item of the set of training data items is a statement about a taxpayer's financial situation.

19. The one or more non-transitory computer-storage media of claim 11, wherein each label of the plurality of labels corresponds to a tax topic.

20. The one or more non-transitory computer-storage media of claim 11, wherein the subject-matter expert selecting a label of the plurality of labels causes a preselected label of the plurality of labels to become automatically unselected.

* * * * *